United States Patent [19]
Cincinatus et al.

[11] Patent Number: 5,953,715
[45] Date of Patent: Sep. 14, 1999

[54] UTILIZING PSEUDOTABLES AS A METHOD AND MECHANISM PROVIDING DATABASE MONITOR INFORMATION

[75] Inventors: Michael J. Cincinatus; Serge Boivin, both of Toronto; Margaret H. Li, Richmond Hill; Richard W. Hedges; K. Bernhard Schiefer, both of Scarborough, all of Canada

[73] Assignee: International Business Machines Corporation, Armonk, N.Y.

[21] Appl. No.: 08/999,920

[22] Filed: Nov. 3, 1997

Related U.S. Application Data

[63] Continuation of application No. 08/514,166, Aug. 11, 1995, abandoned.

[30] Foreign Application Priority Data

Aug. 12, 1994 [CA] Canada ................................. 2130065

[51] Int. Cl.⁶ ................................................ G06F 17/30
[52] U.S. Cl. ............................ 707/3; 707/1; 707/4; 707/5
[58] Field of Search ...................................... 707/1, 3, 4, 5

[56] References Cited

U.S. PATENT DOCUMENTS

| | | | |
|---|---|---|---|
| 3,582,901 | 6/1971 | Cochrane et al. | 340/172.5 |
| 3,692,989 | 9/1972 | Kandlew | 235/153 |
| 4,408,273 | 10/1983 | Plow | 364/200 |
| 4,590,550 | 5/1986 | Eilert et al. | 364/200 |
| 4,644,471 | 2/1987 | Kojima et al. | 364/300 |
| 4,718,025 | 1/1988 | Minor et al. | 364/550 |
| 4,821,178 | 4/1989 | Levin et al. | 364/200 |
| 4,933,848 | 6/1990 | Haderle et al. | 364/300 |
| 4,937,743 | 6/1990 | Rassman et al. | 364/401 |
| 4,947,320 | 8/1990 | Crus et al. | 364/200 |

(List continued on next page.)

FOREIGN PATENT DOCUMENTS

| | | | |
|---|---|---|---|
| A45301/89 | 5/1990 | Australia | G06F 9/06 |
| 407295 | 9/1991 | France | G06F 11/00 |
| 58-117045 | 12/1983 | Japan | G06F 7/22 |

OTHER PUBLICATIONS

Chang et al, "A Network Status Monitoring System Using Personal Computer", IEEE Global Telecommunications Conference and Exhibition. Communication Technology for the 1990's and Beyond, Nov. 27–31 1989, vol. 1, pp. 201–206, 1989.

Chang et al, "A newtork Status Monitoring System Using Personal Computer", IEEE, pp. 201–206, Dec. 1989.

Kandit, AIS: A Foundation for Artificially Intelligent Systems, IEEE, pp. 685–692, Jan. 1989.

Pinto et al, PC Workstation for Ethernet Monitoring and Management, IEEE, pp. 568–570, Sep. 1990.

Mazumdar et al, Monitoring Integrated Networks for Performance Management, IEEE, pp. 289–294, Apr. 1990.

Anonymous, *Dynamic Memory Estimation for Database Monitor Snapshot*, Research Disclosure RD–3470005–A, Mar. 10, 1993.

Hamza, M.H., ED *Proceedings of the IASTED International Symposium, Computers and Advanced Technology in Medicine, Healthcare and Bioengineering* ACTA Press, Anaheim, CA, USA, 99 pp., 1990, (abstract).

(List continued on next page.)

*Primary Examiner*—Thomas G. Black
*Assistant Examiner*—Frantz Coby
*Attorney, Agent, or Firm*—Prentiss W. Johnson

[57] ABSTRACT

A method for externalizing database monitor information, and a database management system incorporating the method, which utilizes the database system's own data manipulation and retrieval system is disclosed. Monitor information is logically available in pseudotable form which may be accessed as any other data. However pseudotables do not actually exist; rather the result set is constructed when a request is made to select from a pseudotable. A predefined format for each pseudotables is stored in the database catalog tables and is used in constructing the tuples from existing internal data structures which are constantly updated with monitor data.

20 Claims, 3 Drawing Sheets

U.S. PATENT DOCUMENTS

| | | | |
|---|---|---|---|
| 4,961,139 | 10/1990 | Hong et al. ............................ | 364/200 |
| 4,975,865 | 12/1990 | Carrette et al. ....................... | 364/513 |
| 5,067,099 | 11/1991 | McCown et al. ...................... | 364/550 |
| 5,072,367 | 12/1991 | Clayton et al. ........................ | 395/600 |
| 5,097,408 | 3/1992 | Huber .................................... | 395/600 |
| 5,133,068 | 7/1992 | Crus et al. ............................. | 395/600 |
| 5,133,075 | 7/1992 | Risch ..................................... | 305/800 |
| 5,151,981 | 9/1992 | Westcott et al. ....................... | 395/375 |
| 5,175,855 | 12/1992 | Putnam et al. ......................... | 395/700 |
| 5,231,381 | 7/1993 | Duwaer .................................. | 340/712 |
| 5,263,158 | 11/1993 | Janis ...................................... | 395/603 |
| 5,301,313 | 4/1994 | Terada et al. .......................... | 395/600 |
| 5,361,350 | 11/1994 | Conner et al. ......................... | 395/600 |
| 5,363,473 | 11/1994 | Stolfo et al. ............................ | 395/50 |
| 5,381,470 | 1/1995 | Cambray et al. ....................... | 379/216 |
| 5,394,546 | 2/1995 | Hanarsuka ............................. | 395/600 |
| 5,412,806 | 5/1995 | Du et al. ................................ | 395/600 |
| 5,471,629 | 11/1995 | Risch ..................................... | 395/800 |
| 5,500,950 | 3/1996 | Becker et al. .......................... | 395/445 |
| 5,504,890 | 4/1996 | Sanford .................................. | 395/600 |
| 5,511,191 | 4/1996 | De Leeuw Van Weenen et al. ...... | 395/605 |
| 5,519,859 | 5/1996 | Grace ..................................... | 395/600 |
| 5,533,103 | 7/1996 | Peavey et al. .......................... | 379/69 |
| 5,561,763 | 10/1996 | Eto et al. ............................. | 395/183.11 |
| 5,574,898 | 11/1996 | Leblang et al. ........................ | 395/601 |
| 5,577,112 | 11/1996 | Cambray et al. ....................... | 379/216 |
| 5,581,482 | 12/1996 | Wiedenman et al. ............... | 364/551.01 |
| 5,602,991 | 2/1997 | Berteau ............................. | 395/200.01 |
| 5,623,403 | 4/1997 | Highbloom ............................ | 395/228 |

OTHER PUBLICATIONS

Risch, T., *Tuning the Reactivity of Database Monitors*, Hewelett—Packard lab, Palo Alto, CA, USA, RPT. No. HPL–90–17, 22 pp., Mar. 1990, (abstract).

Wofson, O.; Sengupta,S.; Yemini, Y; *Managing Communication Networks By Monitoring Databases*, IEEE Transactions On Software Engineering, vol. 17, No. 9, pp. 944–953, Sep. 1991.

Helle, S. *Automating Reorganization (Database Tuning)*, Database Program. Des. vol. 4, No. 5, pp. 28–32, 34–35, May 1991.

Rishch, T.; *Monitoring Database Objects*, Proceedings of the Fifteenth International Conference on Very Large Data Bases, Morgan Kaufmann, Publishers, Inc., Palo Alto, CA, USA, pp. 445–453, 1989.

Parsons, T.J.; *Conceptual Clustering in Relational Structures–An Application in the Domain of Vision*, Proceedings of the Fourth European Working Session on Learning, pp. 163–177, 1990, Morgan Kaufmann Publ. Inc., San Mateo, CA, USA.

Rengarajan, T.K.; Spiro, P.M.; Wright, W.A., *High Availability Mechanisms of VAX DBMS software*, Digit, Tech. J. USA, No. 8, pp. 88–90, Feb. 1989.

Minaev, M.V.; Belyaeva, O.A.; *Using Study and Research Databases for Bibliographic Search Amelioration*, CSVTS, Prague, Czechoslaovakia, 3 vol., pp. 158–161, vol. 1, 1986, Oct. 8–10 1986, (abstract).

Harder, T., *Database Sharing Versus Database Distribution—the Question on System Concepts for Future DB/DC Systems*, Architecture and Operation of Computer Systems, Proceedings of the NTG/GI Meeting, Stuttgart, Germany, Mar. 10–12, 1986, (abstract).

Chapman, R. and D. Willenborg, *Multiple Selection Combo Box*, IBM Technical Disclosure Bulletin, vol. 36, No. 03, Mar. 1993, pp. 347–348.

Banning, K.R.; Gabbert, K.A.; and Li, S.G. *Improved Query Understanding Through the Use of a New Column Window*, IBM Technical Diclosure Bulletin, vol. 33, No. 3B, Aug. 1990, pp. 437–438, Technical Disclosure.

Yothers, J.A., *Building a Parse Tree From an SQLDA*, IBM Technical Disclosure Bulletin, vol. 32, No. 10B, Mar. 1990, pp. 395–396.

Brown, J.R.; Lascelles, M.C.; *Method for Cataloging Elements in a Computer Aided Design*, IBM Technical Disclosure Bulletin, vol. 36, No. 05, May 1993.

Elliott, L.C.; Garrison, J.R.; and Jordan, L.E., *Table–Assisted Methodology for Constructing Complex Data Structures*, IBM Technical Disclosure Bulletin, vol. 32, No. 9A, Feb. 1990, pp. 326–327.

Jacobs, D.C. and Kastelic, F.J. OS/2 *Database Manager Database Event Monitor*, IBM Technical Disclosure Bulletin, vol. 34, No. 4A, Sep. 1991, pp. 150–151.

Boyd, C.; Dang, D.T.; Mayfield, B.J.; and Thuet, H.A., Image Processing Context, IBM Technical Disclosure Bulletin, vol. 36, No. 06B, Jun. 1993, pp. 47–50.

Herrington, K.M.; Pierschalla, B.R.; and Wood, D.E., *Monitor of System Events*, IBM Technical Disclosure Bulletin, vol. 24, No. 9, Feb. 1982.

Nettles, W.B., *Test Resource Manager Broadcast Vector List*, IBM Technical Disclosure Bulletin, vol. 27, No. 2, Jul. 1984, pp. 972–975.

Ojala, R.N.; Shaffer, A.R.; Watts, V.L. *Subsystem Attachment Package*, IBM Technical Disclosure Bulletin, vol. 25, No. 9, Feb. 1983, pp. 4559–4565.

Chang et al, "A network Status Monitoring System Using Personal Computer", IEEE, pp. 201–206, Dec. 1989.

UTILIZING PSEUDOTABLES AS A METHOD AND MECHANISM PROVIDING DATABASE MONITOR INFORMATION

This is a continuation of application Ser. No. 08/514,166, filed Aug. 11, 1995, now abandoned.

BACKGROUND OF THE INVENTION

1. Field of the Invention

This invention pertains to the field of performance monitoring of database systems.

2. Description of the Related Art

Database Administrators and developers often require information regarding the performance of database systems. This so-called "Monitor" information is used for problem determination and performance tuning of the databases and the applications accessing them. This Monitor information includes information on the applications connected to each database, the status of these applications, throughput, response time, hit ratio for caching, number of locks in use, etc.

Database Management Systems (DBMS) for most relational databases keep track of Monitor Information by writing it as data to internal data structures. Some information is tracked in this manner specifically for performance monitoring purposes. Other information is tracked as a necessary feature of the DBMS (eg: the DBMS maintains lists of locks not only for monitoring purposes, but also because the DBMS needs to know which records are locked in order to prevent write access to locked records). This information is accessed through specialized queries (function calls) of these internal data structures.

There are a number of limitations associated with these types of queries. These queries are not very flexible. Only certain specific function calls are included with the DBMS, and the data returned can not easily be reported or manipulated. Additionally, these queries are not easily extendable or updateable, as additional function call code needs to be written for each new query. Furthermore the client-server relationship is not predefined for these function calls and therefore needs to be specifically tailored for each function call made at a non-local node. Finally, these function calls require implementation of a scheme for limiting access to the Monitor Information in order to prevent security breaches.

Any system which provides such monitor information should be designed to minimize its utilization of system resources. The Monitor system must not significantly degrade the performance of the systems it is trying to monitor.

SUMMARY OF THE INVENTION

The present invention provides a method and means for making available this monitor information to user applications which request it. Rather than requiring function call queries by the user, the invention provides for the normalization of the monitor information into a form which the user can query and manipulate directly by the DBMS. The invention provides a means for accessing the monitor information in the same manner as any other information in the databases being monitored is accessed.

According to the invention, this monitor information is provided to requesting applications in the form of virtual tables (pseudotables). The invention provides an interface which allows the user to obtain and manipulate Monitor information as if the data was coming from tables. As far as a user is concerned, the monitor information is stored in tables which are constantly being updated by the DBMS. However, this is not the case. These pseudotables do not really exist as such, and the data is not stored on disk. Rather, the rows of each pseudotable are constructed as the rows are requested.

When a request is made (for example, by an SQL SELECT statement from a particular pseudotable) the DBMS searches the system catalog tables for the access information for the pseudotable, as it would for any other table. The system catalog tables provide access information about the database tables and about the pseudotables. The access information comprises information utilized by the other DBMS components as to the location, type and the predefined format for each table in the database. By searching the catalog table for the access information for the selected table, the DBMS will learn that the table is a pseudotable and obtain its layout. In a preferred embodiment, this access information is used by the optimizer (eg: the SQL compiler) to determine the appropriate access path to access the data.

The access information for a pseudotable instructs the DBMS to call internal functions which read the monitor information from the internal data structures and organize the information into the predefined format for that pseudotable, rather than reading data from an actual table.

Once the data is organized into tuples according to the pseudotable format, the tuples are preferably returned to a relational means (also called the relational layer) for processing the tuples. At this point the DBMS can manipulate the data in the same manner as it would if the data had been accessed by any other access path. In fact, the relational layer will treat the tuples as if they originated from an actual table.

It should be noted that the pseudotables are not actually constructed as tables. Rather, a pseudotable is an abstraction, representing a template or predefined format for organizing the data in these internal data structures. In one embodiment of the present invention, the DBMS constructs a temporary table for holding the tuples as it creates them. These tuples are then returned to the relational layer. However it is imprecise to think that the temporary table is the constructed pseudotable. The constructed temporary table represents the result set from the particular SELECT from a pseudotable. A different temporary table would be generated for each subsequent request from the same pseudotable—although each would be organized in the same manner according to the predefined format for that pseudotable.

By using the DBMS itself as the means for externalizing the Monitor information, the invention utilizes the already existing DBMS client-server relationships and security access provisions. Thus, access to these monitor pseudotables can be GRANTED or REVOKED as with any other database or table. However, because the pseudotables do not really exist, the only access possible is the ability to select from the table. The DBMS will treat the pseudotables as read only tables. Therefore, no one can be GRANTED access to update, insert, etc.

Implementing such a monitor system necessarily requires a series of operations which necessarily tie up system resources. One aspect of the present invention is the fact that the DBMS does not spend time maintaining tables of monitor information ( which would constantly use system resources for such maintenance in exchange for very quick retrieval time), but rather waits for a request before the DBMS constructs the tuples. In so doing the system attempts to minimize the work required by the portions of the DBMS used frequently by most applications (eg the relational layer and the Data Manager). Instead the system uses Database Monitor Services for the more intensive operations because this component only comes into play in response for requests for monitor information.

A broad aspect of the invention provides for a method of providing requesting applications with database monitor information which is automatically tracked by a database management system in internal data structures comprising the steps of providing a query, for particular monitor information; accessing access information on how to retrieve said monitor information, said access information including a predefined format for organizing said monitor information; and utilizing said access information to construct tuples of monitor information, according to said predefined format, from the database management system internal data structures.

Another aspect of the invention provides for a database management system capable of providing monitor information in table form to a requesting application comprising means for storing and updating monitor information in internal data structures; means for processing a query from a requesting application; catalog means for storing access information on how to access the requested monitor information, said access information including a predefined format for organizing the information; means for searching said catalog means for said access information; relational means for processing tuples and returning said tuples to the requesting application comprising means for using said access information to formulate tuple requests, said tuple requests include said predefined format for the tuples to be returned and their location; internal data structures which the database management system updates with monitor data; and database monitor means for generating a result set which satisfies the tuple request comprising means for reading said monitor information from said internal data structures, and means for organizing said monitor information into tuples according to said predefined format.

Another aspect of the invention provides for a monitoring mechanism for providing monitor information in table form for use with a database management system having means for accepting and processing queries, catalog tables, and internal data structures which the database management system updates with monitor data, said monitoring mechanism comprising means for updating said catalog tables to provide access information for tables of monitor information, including a predefined format for said tables; and database monitor means, which utilizes said access information for organizing the monitor data in table form.

These foregoing aspects of the invention, together with other aspects and advantages thereof will be more apparent from the following description of the preferred embodiments thereof, taken in conjunction with the following drawings.

DETAILED DESCRIPTION OF THE PREFERRED EMBODIMENT

The preferred embodiment is discussed and illustrated with respect to an example of its implementation in a particular DBMS. It should be appreciated that the invention can be implemented similarly in other relational database systems.

Figure 1:
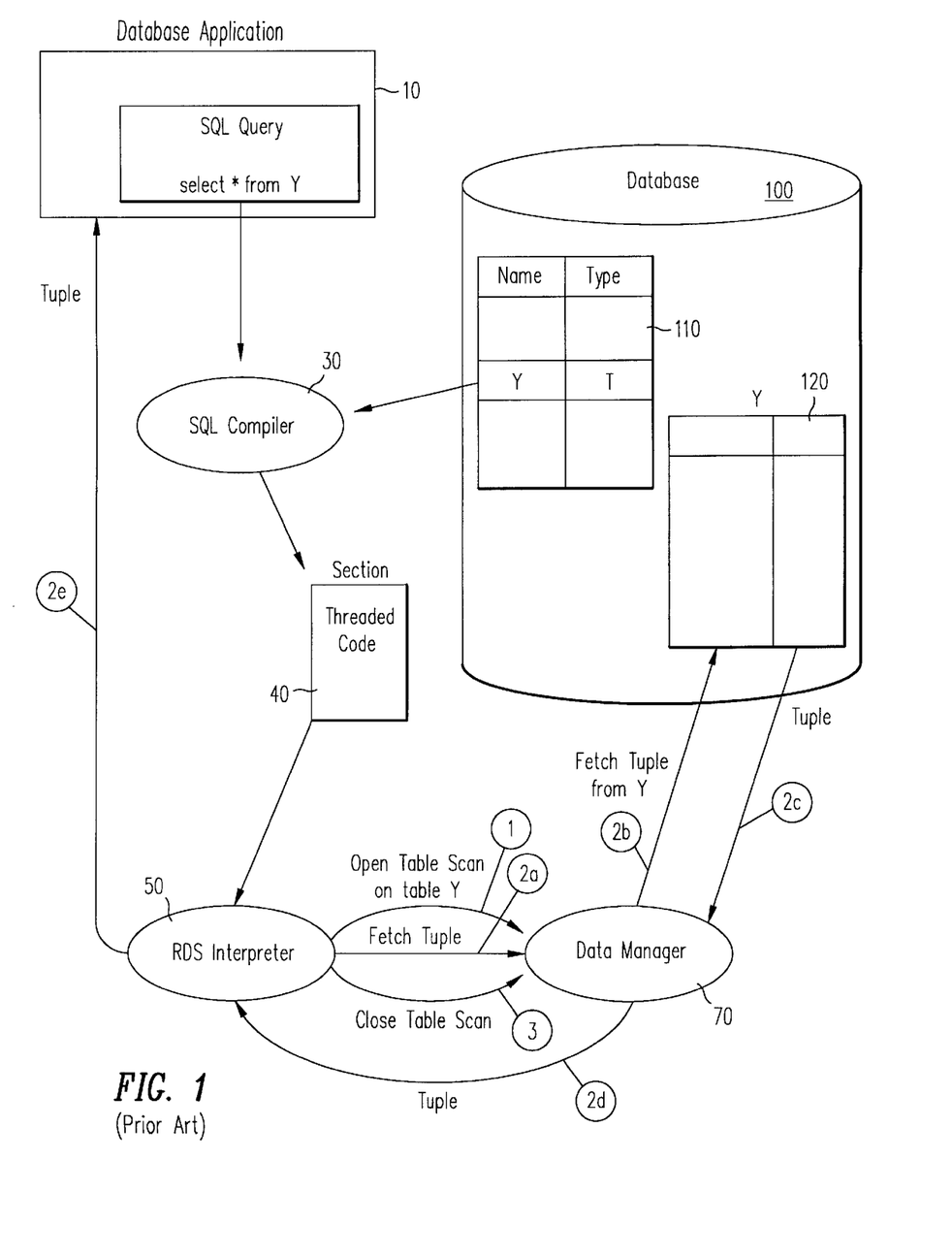
FIG. 1 is a schematic diagram illustrating how an SQL Select query (using a table scan access path) is normally executed by the Database Engine (prior art).

Before discussing the preferred embodiment of the present invention, it is helpful to highlight how the example DBMS currently retrieves information from a database. FIG. 1 illustrates the major elements of such a system, namely a database application 10, the database 100 (which actually stores all the data in tables), and the DBMS, which consists of three primary components: the SQL Compiler 30, the Relational Data Services (RDS) Interpreter 50 (which is also called the Relational Layer), and the Data Manager 70.

The Database 100 consists of a series of tables, including system or catalog tables, and data tables. FIG. 1 shows two tables, the catalog table providing access information about the database tables and their types at 110, and table Y, which is a data table, at 120.

FIG. 1 also illustrates the steps required to process a SELECT statement against a real table (ie, an actual data table). First, a database application 10 sends an SQL SELECT statement to the DBMS. In response, the SQL compiler 30 will obtain access information regarding the definition of Y in the system catalog table 110. The SQL compiler 30 uses this access information to determine the optimal access path for obtaining the desired information. The SQL compiler then creates a section of threaded code 40 which instructs the other DBMS components how to access the data.

The access path that the compiler will choose depends on the objects (e.g. tables) on which the SQL statement will be operating. The SQL compiler can tell that Y is a real table because the access information in the system catalog table 110 designates table Y as type T. In FIG. 1, the access path chosen is a table scan. The behaviour of other access methods (e.g. index scans, joins, sorts, etc.) will be quite different. A table scan is illustrated in order to best contrast real table accesses from pseudotable accesses.

In the case of dynamic SQL, the section 40 is executed immediately after it is compiled. In the case of static SQL, the section is stored in another system catalog until an application requests that the section be loaded from the system catalog and executed.

In either case, the RDS (relational data services) component 50 executes the section in three steps:

In step one (indicated generally by arrow 1), RDS 50 calls Data Manager 70 to open a table scan on the table. In response to this request, Data Manager opens a cursor (an abstraction for a pointer to rows in a table for selecting multiple rows from a table). Data Manager 70 also manages the transaction processing and data protection (locking) that will be required while the rows of the table are being read.

Step two is the fetch step and is indicated generally by arrows 2a–e. For each required row, RDS 50 calls Data Manager 70 and requests that a tuple be returned (arrow 2a). Data Manager then reads a row from table Y 120, updates the location of the cursor, and returns the tuple to RDS (arrows 2b–d). Data Manager also handles the locking to guarantee that consistent data is returned. In addition, Data Manager handles the caching of the data.

As far as RDS is concerned, Data Manager is a black box which simply returns tuples. When RDS has received a tuple RDS returns the tuple to the calling application, assuming the tuple satisfies the select criteria (arrow 2e). For example, if there is a WHERE clause on the query then RDS might not return the tuple to the application if the WHERE clause predicate is not satisfied by the tuple. This treatment of the WHERE clause is called a "residual predicate" and is one way that the filtering of data might be handled.

In the third step (arrow 3), once RDS is finished the query, it calls Data Manager to close the table scan. In response to this request, Data Manager closes its cursor and frees any resources that were required to perform the table scan.

Figure 2:
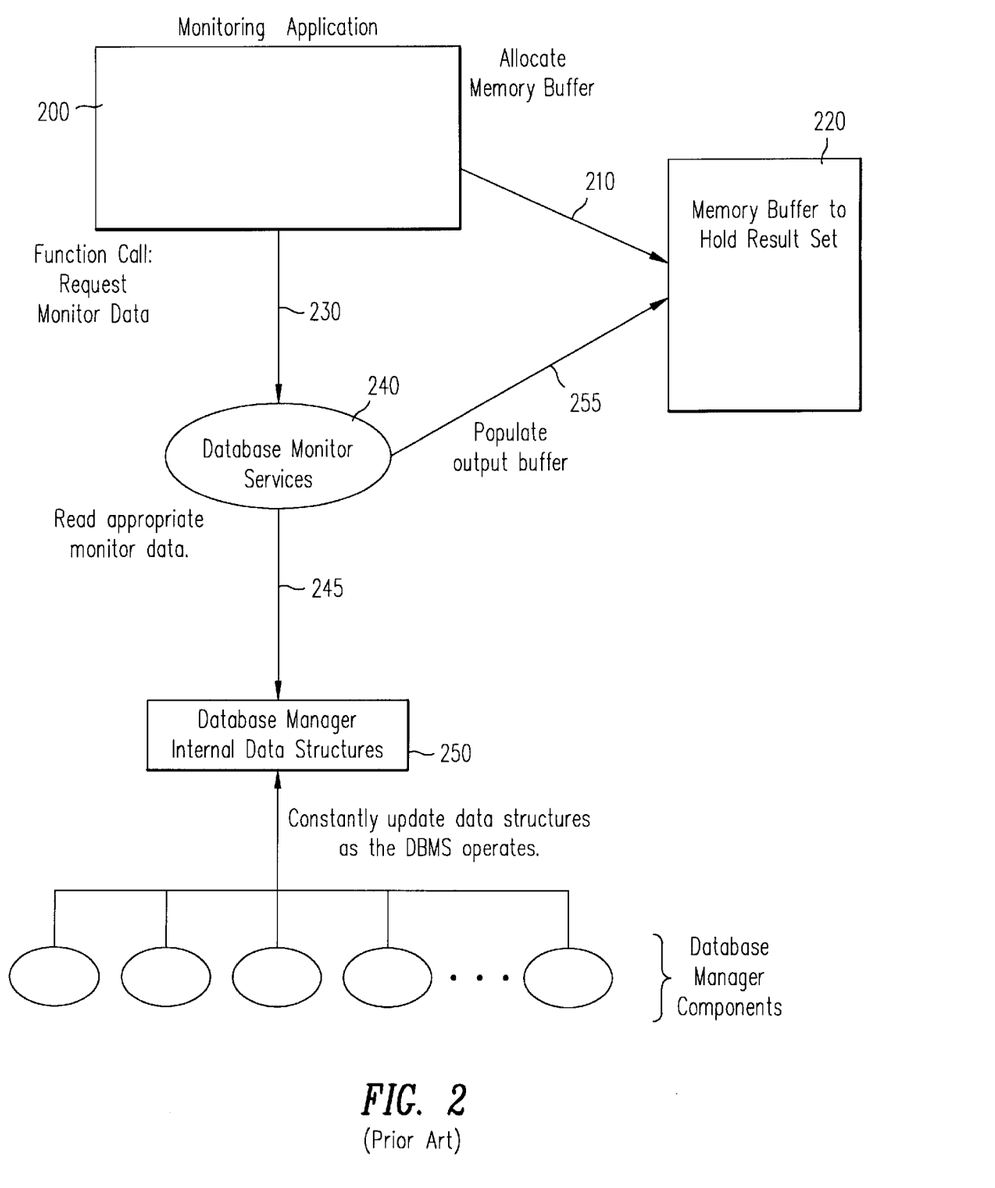
FIG. 2 is a schematic diagram illustrating how monitor information is normally obtained using function calls (prior art).

FIG. 2 illustrates an example of the current function call method used by the example DBMS for accessing monitor information. If a monitoring application 200 requires monitor information, for example the number of records locked at any instant in time, it must first allocate a memory buffer 220 large enough to hold the result set from the monitor query, as is indicated by arrow 210. In order to estimate the required size of this buffer, a separate function call is required. This function call (not illustrated) returns the size of the output buffer in which the result set is to be returned.

Once the monitoring application 200 has allocated the memory buffer, the application then executes a function call 230 to the DBMS and requests that the appropriate monitor information be returned. Function call 230 is a standard function call which is included with the DBMS.

The DBMS then passes the request for monitor information to Database Monitor Services 240. The Database Monitor Services 240 is a DBMS facility capable of reading and interpreting the monitor data from the contents of the Database Manager Internal Data Structures 250, as shown at arrow 245. The data in these structures are constantly being updated by the other DBMS components (e.g. RDS, Data manager, etc.) as the DBMS operates. For example, Data Manager 70 locks each record as it is accessed. Every time it locks a record, it updates a set of internal memory data structure comprising a list of the records that are locked.

Once Database Monitor Services 240 has received the data, it formats the data by rearranging the data into records of known size and type. It then writes each data record sequentially to the output buffer, as shown at arrow 255, until it has returned all the data or the buffer is full. When all of the data has been written to the buffer, the DBMS returns control back to the monitoring application. It is the monitoring application's responsibility to interpret the data in the buffer, and to free the buffer when the data is no longer required. In this example, the Monitoring Application wanted to know the number of records locked. The standard function call query returns the entire lock list, from which the Application 200 would have to calculate the desired information.

Figure 3:
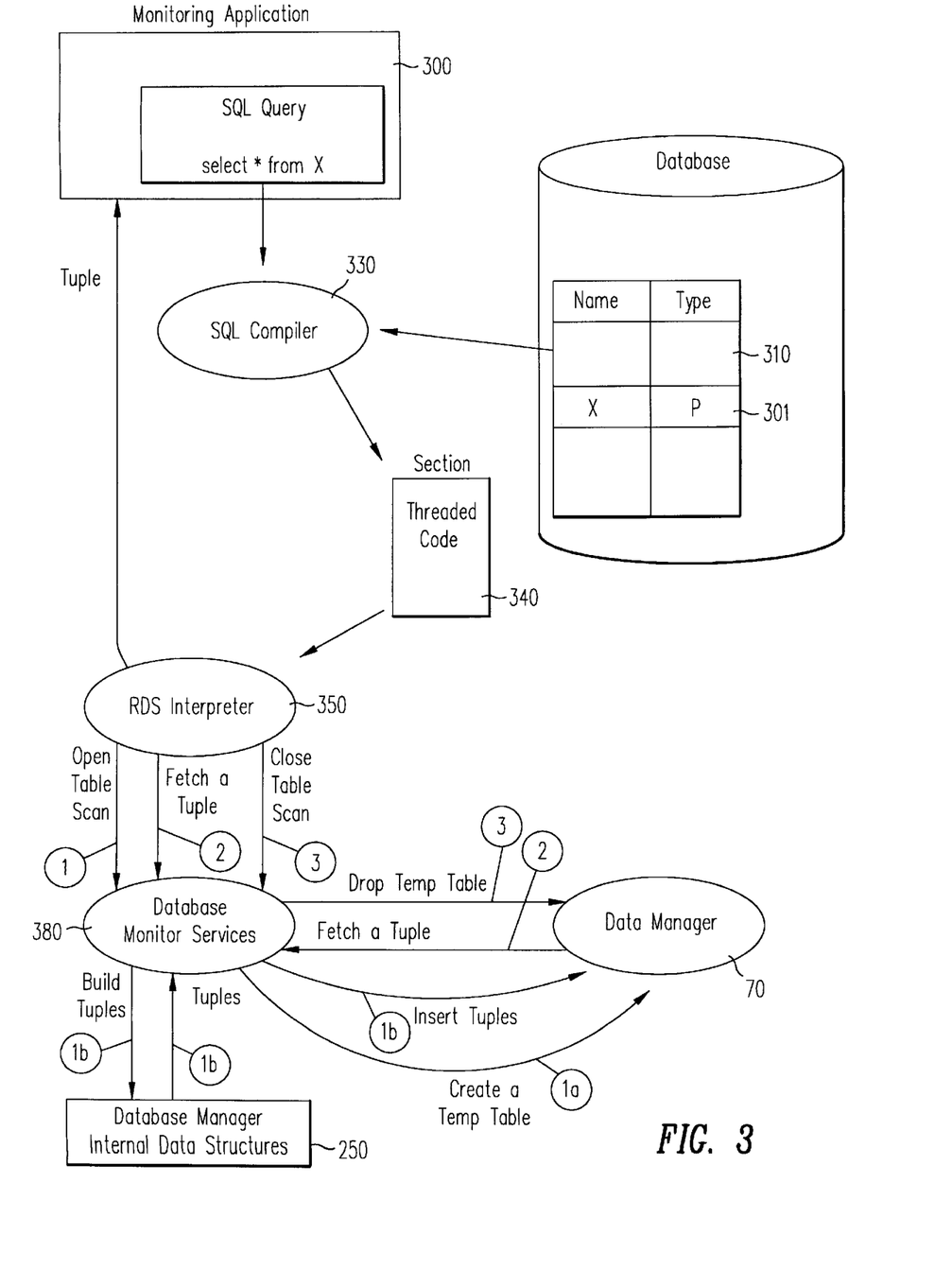
FIG. 3 is a schematic diagram illustrating how an SQL query would be executed by a preferred embodiment of the present invention to obtain monitor information.

The present invention eliminates the requirements for these function calls and the requirement for the monitoring application to manage its own memory buffer to hold the result set. Instead the DBMS is utilized to generate, manipulate and return the result set. An example of how the preferred embodiment accomplishes this is illustrated in FIG. 3.

In operation, an application requests monitor information in the form of a SELECT statement from a pseudotable. As stated earlier, pseudotables are abstractions which do not really exist, but, as far as the user is concerned, there are a series of (pseudo)tables storing monitor data which can be retrieved and processed like any other table. For example, the application may require information regarding locked records, and would therefore SELECT from a pseudotable called X, which, as far as the application is concerned, is a table of lock statistics. Assuming the user running the application has been GRANTED access to pseudotable X, the following are the steps required to process a select statement against pseudotable X:

First, a Monitor application 300 sends an SQL SELECT statement to the DBMS. In response, the SQL compiler 330 obtains access information regarding the definition of X from the system catalog table 310, in the same manner as in FIG. 1. The DBMS must maintain an entry for each pseudotable in the system catalogues just as if the pseudotables were real tables. As shown in FIG. 3, the entry 301 in the Catalog Table for table X identifies X as a pseudotable.

In the case of a pseudotable, the usual access path will be a table scan (although an index type scan could be implemented in certain cases for performance reasons). Thus, FIG. 3 (as with FIG. 1) illustrates the components and steps used in performing a table scan. The SQL compiler 330 in the preferred embodiment is modified so as to be able to generate a suitable section of threaded code 340 to carry out a table scan of a pseudotable.

In the case of dynamic SQL, the section is executed immediately after it is compiled. In the case of static SQL, an application must request that the section be loaded from the system catalogues and be executed. Either way, there is no difference in this respect from the way an SQL statement is executed against a real table. In fact, there is no reason why the SQL statement cannot join data between a real table and a pseudotable.

Preferably the RDS (relational data services) component 350 executes the section in three steps.

First, the operator used in the threaded code 340, tells RDS 350 to perform a table scan on pseudotable X. As a result RDS 350 calls Database Monitor Services 380, rather then Data Manager 70, to open a table scan. Preferably, Database Monitor Services 380 builds the entire result set (i.e. all of the tuples that are to be returned) when the table scan is opened because the actual query might be executed over a long period of time, while the results of the query are supposed to represent the database activity at an instant in time. Otherwise the normal operations of the DBMS could update the monitor information stored in the Database Manager Internal Data Structures 250 before all the tuples had been fetched by RDS.

Database Monitor Services 380 builds the entire result set in the form of a temporary table in the following manner, as shown generally by arrows 1a and 1b:

1a. Database monitor 380 calls the Data Manager 70 (which already knows how to build, fill, and manage temporary tables) to create a temporary table in which the tuples will be stored.

1b. The Database monitor 380 builds each tuple and inserts it into the temporary table. Database Monitor 380 creates the tuples by reading the relevant data from the internal data structures 250, in the same manner as in FIG. 2, and then restructuring the data in the form of tuples, according to the predefined format for each pseudotable.

The second step is the fetch step, as shown generally by the arrows identified with the number 2. Each time RDS fetches a row, Database Monitor Services 380 calls the data manager 70 to return a tuple from the temporary table, which is subsequently passed back to RDS. RDS can then perform any filtering on the tuple (eg. residual predicates) to determine whether or not to return it to the requesting application. Once RDS has the tuple, there is no significant difference in operation from a SELECT from a real table. In fact, once Data Manager has built a temporary table housing the result set, RDS could fetch the tuple directly from Data Manager, rather then sending the fetch requests to Database Monitor Services.

Finally, when RDS has finished the query, it calls database monitor services to close the table scan. In response to this request, Database Monitor calls Data Manager and requests that it drop the temporary table. This is shown generally by the arrows identified with the number 3. Alternatively, RDS could directly call Data Manager to drop the temporary table.

In order to implement this example of the preferred embodiment, the following changes would need to be made to the example DBMS:

1) the catalog tables require an entry for each pseudotable, providing the necessary access information regarding each pseudotable just as if the pseudotables were real tables.

2) the SQL Compiler needs to be updated to be able to identify pseudotables (which it determines from the catalog tables) and how to optimize the query to compile a suitable Access Path. The SQL compiler must also be updated to return an error message for any request to update a pseudotable (which of course can not be updated by any application since pseudotables do not really exist).

3) the relational layer (such as shown as the Relational Data Services (RDS) Interpreter) needs to be updated with instructions on how to interpret and execute the threaded code for accessing the pseudotables. In this example, RDS must be instructed to interface with Database Monitor Services for carrying out a table scan of a pseudotable rather then interfacing with Data Manager directly. In this example, RDS retrieves the tuples from the constructed temporary table on a tuple-by-tuple basis with each fetch. Once Database Monitor Services/Data Manager have constructed the temporary table, RDS can either fetch tuples directly from Data Manager, or indirectly from Database Monitor Services (as illustrated in FIG. 3), depending on implementation.

4) Database monitor means (such as shown as Database Monitor Services) needs to be implemented to interface with the RDS, and Data Manager as well as the Database Manager Internal Data Structures in order to construct the tuples comprising the result set of the pseudotable enquiry.

Data Manager can already create temporary tables, etc, and does not need major revision to create them from tuples generated by Database Monitor Services rather then stored in real tables. Also Data Manager already can use a cursor for returning the tuples from its temporary tables, so no change to this is needed.

As already stated, the above example shows how to implement the preferred embodiment in an example DBMS. The invention can be implemented in other database systems by making the corresponding changes to the equivalent elements as set out above.

It will be apparent that many other changes may be made to the illustrative embodiments, while falling within the scope of the invention and it is intended that all such changes be covered by the claims appended hereto.

What is claimed is:

1. A method of providing a requesting application with monitor information which is automatically tracked by a database management system in internal data structures, said database management system having data manipulating components, comprising the steps of:

providing a query for said monitor information;

accessing access information on how to retrieve said monitor information, said access information including a predefined format for organizing said monitor information;

utilizing said access information to construct tuples of monitor information, according to said predefined format, from said internal data structures, said step of utilizing comprising the steps of:

creating a temporary table for holding said tuples, said temporary table being organized according to said predefined format;

reading said monitor information from said internal data structures;

organizing said monitor information into tuples according to said predefined format; and inserting each tuple into said temporary table.

2. The method as claimed in claim 1 further comprising the step of utilizing said database management system's data manipulating components for outputting and manipulating said constructed tuples.

3. The method as claimed in claim 2 wherein said database management system further comprises a relational layer for manipulating tuples, and said step of utilizing the database management system's data manipulating components for outputting and manipulating said constructed tuples comprises the steps of:

fetching each one of said tuples from said temporary table and returning each one of said tuples to said relational layer;

ensuring said tuples satisfy said query; and returning said tuples to said requesting application which provided said query.

4. The method as claimed in claim 2 wherein said database management system further comprises a relational layer for manipulating tuples, and said step of utilizing the database management system's data manipulating components for outputting and manipulating the constructed tuples comprises the steps of:

fetching each one of said tuples from said temporary table and returning each one of said tuples to said relational layer;

processing said returned tuples to ensure said returned tuples satisfy said query; and returning said processed tuples to said requesting application which provided said query.

5. The method as claimed in claim 1, wherein said query is in the form of a select from a pseudotable, said pseudotable being an entry in the database management system catalog tables, wherein said access information for said pseudotable provides information on a location and a predefined format for said pseudotable, and wherein said step of accessing access information comprises the step of searching said system catalog tables for said entry for said pseudotable.

6. A database management system capable of providing monitor information in table form to a requesting application, said database management system comprising:

means for storing and updating said monitor information in internal data structures;

means for processing a query from said requesting application;

catalog means for storing access information on how to access said monitor information, said access information including a predefined format for organizing said monitor information;

means for searching said catalog means for said access information;

relational means for processing tuples and returning said tuples to said requesting application comprising means for using said access information to formulate a tuple request, said tuple request including said predefined format for said tuples to be returned and their location;

internal data structures which said database management system updates with said monitor information;

data manager means for building and managing temporary tables; and database monitor means for generating a result set which satisfies said tuple request comprising:
means for reading said monitor information from said internal data structures, and
means for organizing aid monitor information into tuples according to said predefined format, said database monitor means further comprising means for utilizing said data manager means to construct and store said temporary tables which are filled with tuples constructed by said database monitor means.

7. The database management system as claimed in claim 6 wherein said relational means further comprises interface means for fetching tuples from said database monitor means, and wherein said database monitor means is adapted to interface with both said relational means and said data manager means in response to a fetch for a tuple generated by said interface means.

8. The database management system as claimed in claim 6 wherein said relational means comprises interface means for fetching tuples directly from said data manager means.

9. A monitoring mechanism for providing monitor information in table form for use with a database management system having means for accepting and processing queries, catalog tables, and internal data structures which said database management system updates with monitor information and for use with a database management system which further includes a relational layer for processing tuples and returning said tuples to a requesting application, and a data manager means for constructing and managing temporary tables, said monitoring mechanism comprising:

means for updating said catalog tables to provide access information for tables of monitor information, including a predefined format for said tables;

means for updating said relational layer to interface with a database monitor means, by sending tuple requests, which include said predefined format, to said database monitor means, upon execution of a query for said monitor information; and said database monitor means, which utilizes said access information for organizing said monitor information in table form, said database monitor means further comprising:
means for reading said monitor information from said internal data structures;
means for organizing said monitor information into tuples according to said predefined format;
means for interfacing with said relational layer, including means for accepting said tuple requests; and
means for interfacing with said data manager means in order to create a temporary table for the tuples generated by said database monitor means.

10. The monitoring mechanism as claimed in claim 9, wherein said database monitor means for interfacing with said relational layer further comprises means for returning a returned tuple to said relational layer in response to each fetch request received from said relational layer, said returned tuple obtained from said temporary table by said means for interfacing with said data manager means.

11. An article of manufacture for use in a computer system for a requesting application with database monitor information which is automatically tracked by a database management system in internal data structures, said article of manufacture comprising a computer-readable storage medium having a computer program code embodied in said medium which may cause the computer to:

provide a query for particular monitor information;

access access information on how to retrieve said monitor information, said access information including a predefined format for organizing said monitor information; and utilize said access information to construct tuples of monitor information, according to said predefined format, from said internal data structures by causing the computer to:
read said monitor information from said internal data structures;
organize said monitor information into tuples according to said predefined format;
create a temporary table for holding said tuples, said temporary table being organized according to said predefined format;
read said monitor information from said internal data structures;
organize said monitor information into tuples according to said predefined format; and
insert each tuple into said temporary table.

12. The article of manufacture of claim 11 wherein the computer program code may cause the database management system to utilize said database management system's data manipulating components for outputting and manipulating said constructed tuples.

13. The article of manufacture of claim 12 wherein said database management system comprises a relational layer for manipulating tuples, and wherein the computer program code may cause said system to utilize said system's data manipulating components for outputting and manipulating said constructed tuples by causing said system to:
fetch each one of said tuples from said temporary table and return each one of said tuples to said relational layer;
ensure said tuples satisfy said query; and
return said tuples to said requesting application which provided said query.

14. The article of manufacture of claim 12 wherein said database management system further comprises a relational layer for manipulating tuples, and wherein the computer program code may cause said system to utilize said system's data manipulating components for outputting and manipulating said constructed tuples by causing the computer to:
fetch each one of said tuples from said temporary table and return each one of said tuples to said relational layer;
process said returned tuples to ensure said returned tuples satisfy said query; and
return said processed tuples to said requesting application which provided said query.

15. The article of manufacture of claim 11 wherein said query is in the form of a select from a pseudotable, said pseudotable being an entry in the database management system catalog tables, wherein said access information for said psuedotable provides information on a location and a predefined format for said pseudotable, and wherein the computer program code may cause said system to access access information by causing said system to search said system catalog tables for said entry for said pseudotable.

16. An article of manufacture for use in a database management system capable of providing monitor information in table form to a requesting application, said article of manufacture comprising a computer-readable storage medium having a computer program code embodied in said medium which may cause said database management system to:

store and update said monitor information in internal data structures;

process a query from said requesting application;

store, in a catalog, access information on how to access said monitor information, said access information including a predefined format for organizing said monitor information;

search said catalog for said access information;

cause a relational layer to process tuples and return said tuples to said requesting application by causing the computer to use said access information to formulate a tuple request, said tuple request including said predefined format for said tuples to be returned and their location;

update internal data structures with monitor information;

generate a result set which satisfies said tuple request by causing a database monitor to read said monitor information from said internal data structures, and to organize said monitor information into tuples according to said predefined format;

build and manage temporary tables by a data manager; and cause said database monitor to utilize said data manager to construct and store said temporary tables which are filled with tuples constructed by said database monitor.

17. The article of manufacture of claim 16 wherein the computer program code may cause the relational layer to fetch tuples from said database monitor, and wherein said database monitor is adapted to interface with both said relational layer and said data manager in response to a fetch for a tuple generated by said interface.

18. The article of manufacture of claim 16 wherein the computer program code may cause the relational layer to fetch tuples, through an interface, directly from said data manager.

19. An article of manufacture for use in a monitoring mechanism for providing monitor information in table form for use with a database management system capable of accepting and processing queries, said database management system having catalog tables and internal data structures which said database management system updates with monitor information, said database management system further including a relational layer for processing tuples and returning said tuples to a requesting application and a data manager for constructing and managing temporary tables, said article of manufacture comprising a computer-readable storage medium having a computer program code embodied in said medium which may cause the monitoring mechanism to:

update said catalog tables to provide access information for tables of monitor information, including a predefined format for said tables;

update said relational layer to interface with a database monitor, by sending tuple requests, which include said predefined format, to said database monitor, upon execution of a query for said monitor information;

and wherein said computer program may further cause the database monitor to:

utilize said access information for organizing said monitor data in table form;

read said monitor information from said internal data structures;

organize said monitor information into tuples according to said predefined format;

interface with said relational layer, including accepting said tuple requests; and interface with said data manager in order to create a temporary table for the tuples generated by said database monitor.

20. The article of manufacture of claim 19 wherein the computer program code may cause said database monitor to interface with said relational layer to return a returned tuple to said relational layer in response to each fetch request received from said relational layer, said returned tuple obtained from said temporary table by causing the database monitor to interface with the data manager.

* * * * *